(12) United States Patent
Mihira

(10) Patent No.: US 10,572,204 B2
(45) Date of Patent: Feb. 25, 2020

(54) COMMUNICATION APPARATUS AND CONTROL METHOD FOR CONTROLLING COMMUNICATION APPARATUS

(71) Applicant: CANON KABUSHIKI KAISHA, Tokyo (JP)

(72) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/126,872

(22) Filed: Sep. 10, 2018

(65) Prior Publication Data

US 2019/0004760 A1 Jan. 3, 2019

Related U.S. Application Data

(63) Continuation of application No. 15/462,413, filed on Mar. 17, 2017, now Pat. No. 10,108,382.

(30) Foreign Application Priority Data

Mar. 24, 2016 (JP) ................................ 2016-060643

(51) Int. Cl.
| | |
|---|---|
| *G06F 3/12* | (2006.01) |
| *H04W 76/14* | (2018.01) |
| *G06K 7/14* | (2006.01) |
| *G06K 7/10* | (2006.01) |
| *G06K 19/06* | (2006.01) |
| *H04N 1/32* | (2006.01) |
| *H04N 1/327* | (2006.01) |
| *H04N 5/225* | (2006.01) |
| *H04W 4/12* | (2009.01) |
| *H04W 8/00* | (2009.01) |
| *H04W 8/26* | (2009.01) |
| *H04W 84/12* | (2009.01) |

(52) U.S. Cl.
CPC .......... *G06F 3/1292* (2013.01); *G06F 3/1236* (2013.01); *G06K 7/1095* (2013.01); *G06K 7/1417* (2013.01); *G06K 19/06037* (2013.01); *H04N 1/32122* (2013.01); *H04N 1/32518* (2013.01); *H04N 1/32776* (2013.01); *H04N 5/225* (2013.01); *H04W 4/12* (2013.01); *H04W 8/005* (2013.01); *H04W 8/26* (2013.01); *H04W 76/14* (2018.02); *H04N 2201/3208* (2013.01); *H04W 84/12* (2013.01)

(58) Field of Classification Search
CPC ............................. G06F 3/1292; G06F 3/1236
See application file for complete search history.

(56) References Cited

U.S. PATENT DOCUMENTS 9,690,746 B1 * 6/2017 Hosea ................. H04L 41/0853
2005/0128968 A1 * 6/2005 Yang .................... H04W 48/16
370/312

(Continued)

FOREIGN PATENT DOCUMENTS

JP 2015-060242 A 3/2015
JP 2015-228114 A 12/2015

*Primary Examiner* — Ibrahim Siddo
(74) *Attorney, Agent, or Firm* — Canon U.S.A. Inc., IP Division

(57) ABSTRACT

A communication apparatus searches for a device by reading a two-dimensional code displayed by the device and notifies a user to use a direct wireless communication function of the device in a case where the device cannot be detected.

16 Claims, 12 Drawing Sheets

(56) References Cited

U.S. PATENT DOCUMENTS

| | | | | |
|---|---|---|---|---|
| 2006/0171535 A1* | 8/2006 | Omae | .................... | G06F 21/10 |
| | | | | 380/201 |
| 2007/0230473 A1* | 10/2007 | Nishiyama | ........ | H04L 29/12009 |
| | | | | 370/392 |
| 2013/0003120 A1* | 1/2013 | Watariuchi | ............ | G06F 3/1204 |
| | | | | 358/1.15 |
| 2013/0250358 A1* | 9/2013 | Suzuki | ................ | H04L 65/1069 |
| | | | | 358/1.15 |
| 2015/0081845 A1* | 3/2015 | Arai | .................... | G06F 3/1204 |
| | | | | 709/218 |
| 2015/0350462 A1 | 12/2015 | Asai | | |
| 2017/0237467 A1* | 8/2017 | Rovatti | ................ | H04W 12/02 |
| | | | | 455/41.3 |

\* cited by examiner

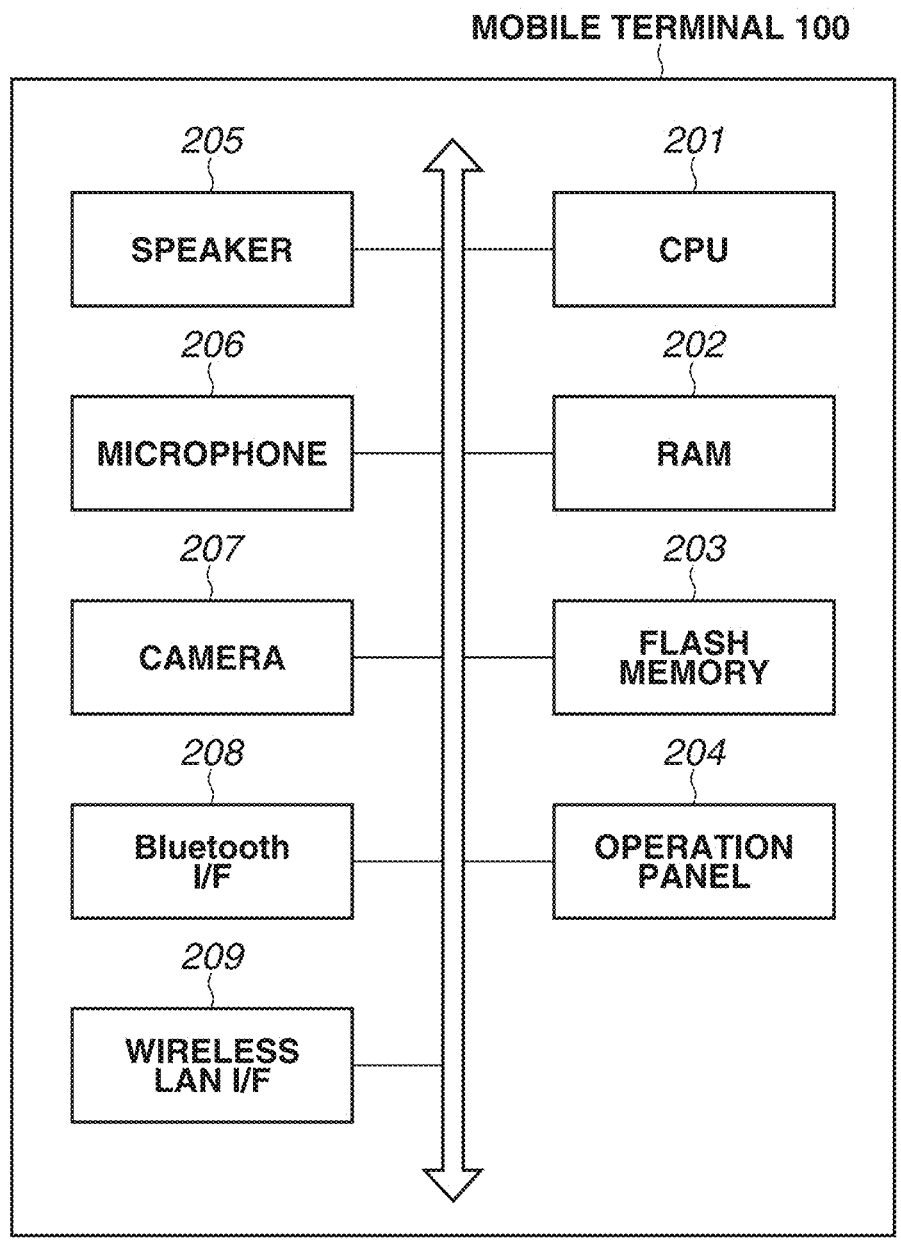

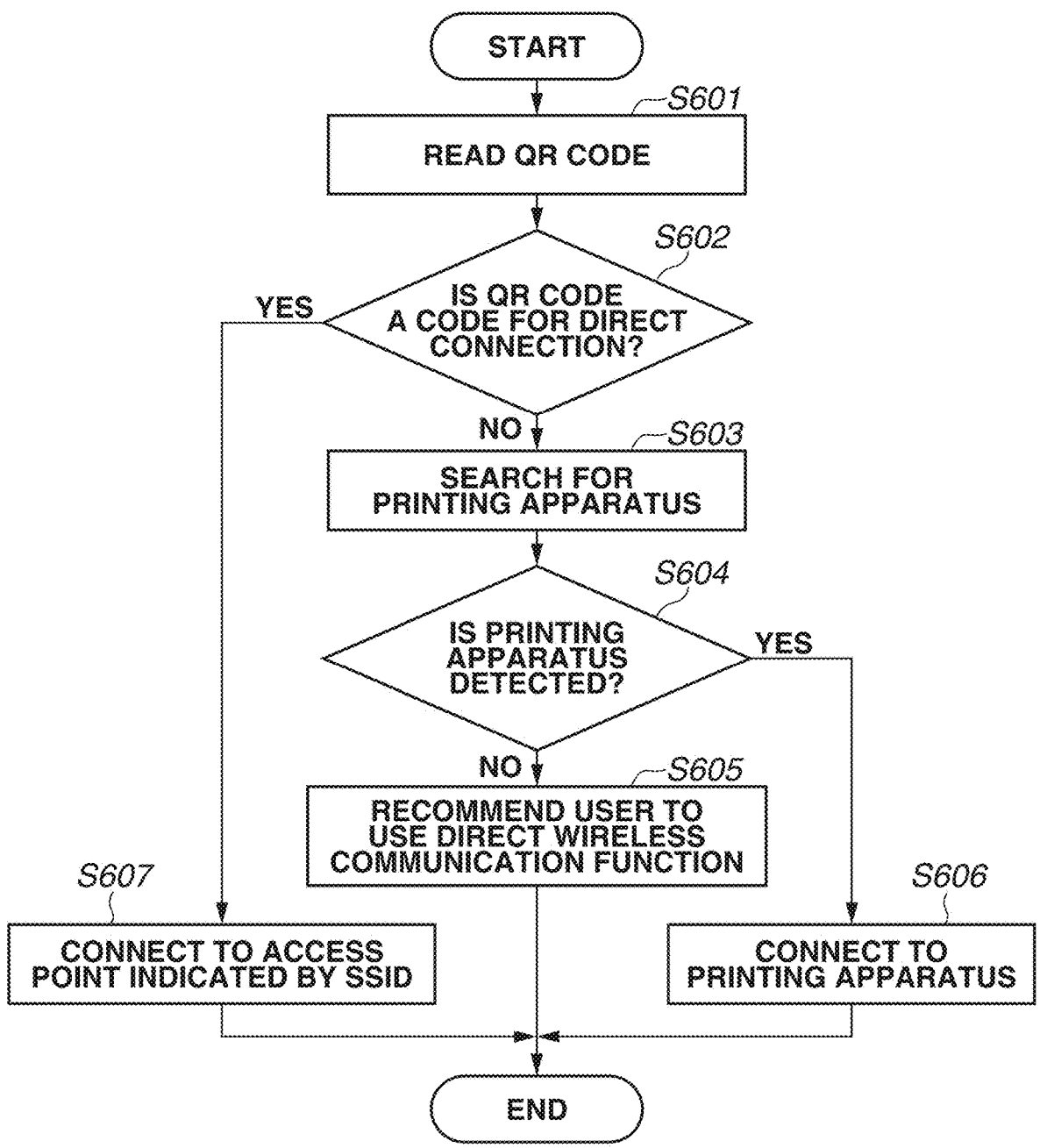

APPLICATION SCREEN 700

APPLICATION SCREEN 710

APPLICATION SCREEN 720

APPLICATION SCREEN 730

SETTING SCREEN 800

WHEN SETTING OF DIRECT WIRELESS COMMUNICATION FUNCTION IS ON.

CONNECTION SCREEN 900

CONNECTION SCREEN 510

CONNECTION SCREEN 520

WHEN SETTING OF DIRECT WIRELESS COMMUNICATION FUNCTION IS OFF.

COMMUNICATION APPARATUS AND CONTROL METHOD FOR CONTROLLING COMMUNICATION APPARATUS

CROSS-REFERENCE TO RELATED APPLICATIONS

This application is a continuation of U.S. patent application Ser. No. 15/462,413 filed Mar. 17, 2017, which claims the benefit of Japanese Patent Application No. 2016-060643, filed Mar. 24, 2016, all of which are hereby incorporated by reference herein in their entirety.

BACKGROUND OF THE INVENTION

Field of the Invention

The present invention relates to a communication apparatus and a control method for controlling the communication apparatus.

Description of the Related Art

A communication apparatus such as a smartphone having a wireless local area network (LAN) function can wirelessly communicate with another device by connecting to an access point. Japanese Patent Application Laid-Open No. 2006-261938 discusses a device that displays a two-dimensional code including a service set identifier (SSID) of an access point. The communication apparatus can connect to the access point indicated by the SSID included in the two-dimensional code by reading the two-dimensional code using a camera function.

Further, there is a device which is provided with a direct wireless communication function such as a software access point mode or a Wi-Fi direct function. When the device executes the direct wireless communication function, the device generates an SSID and displays a two-dimensional code that includes the generated SSID. The communication apparatus connects to the device by reading the two-dimensional code.

Further, there is a case where the SSID of the access point is not included in the two-dimensional code displayed by the device. The communication apparatus that has read the above two-dimensional code searches for the device by using address information such as an internet protocol (IP) address or a media access control (MAC) address included in the two-dimensional code, and connects to the device detected in the search operation.

A case in which the device displays a two-dimensional code which does not include the SSID of the access point will be considered. If the read two-dimensional code does not include the SSID of the access point, in order to connect to the device, the communication apparatus has to participate in the same network which the device participates in. If the communication apparatus does not participate in the same network which the device participates in, the communication apparatus cannot connect to the device. On the other hand, even if the communication apparatus does not participate in the same network which the device participates in, the communication apparatus can possibly connect to the device if the direct wireless communication function of the device is used. However, a general user does not fully understand that the user can connect the communication apparatus to the device by using the direct wireless communication function of the device. Accordingly, in a case where the user cannot connect the communication apparatus to the device because the communication apparatus does not participate in the same network which the device participates in, the user does not know how to connect the communication apparatus to the device.

SUMMARY OF THE INVENTION

According to an aspect of the present invention, a communication apparatus includes a reading unit configured to read a two-dimensional code displayed by a device, a searching unit configured to search for the device based on address information included in the two-dimensional code, and a notification unit configured to notify a user of the communication apparatus to use a direct wireless communication function of the device in a case where the device cannot be detected through search operation executed by the searching unit.

Further features of the present invention will become apparent from the following description of exemplary embodiments with reference to the attached drawings.

BRIEF DESCRIPTION OF THE DRAWINGS

FIG. 2 is a block diagram illustrating a hardware configuration of a mobile terminal.

FIG. 6 is a flowchart illustrating processing executed by the mobile terminal.

DESCRIPTION OF THE EMBODIMENTS

Hereinafter, a favorable exemplary embodiment embodying the present invention will be described with reference to the appended drawings. The embodiments described hereinafter are not intended to limit the content of the present invention described in the appended claims, and not all of the combinations of features described in the exemplary embodiments are necessary for the solutions of the present invention.

Figure 1A:
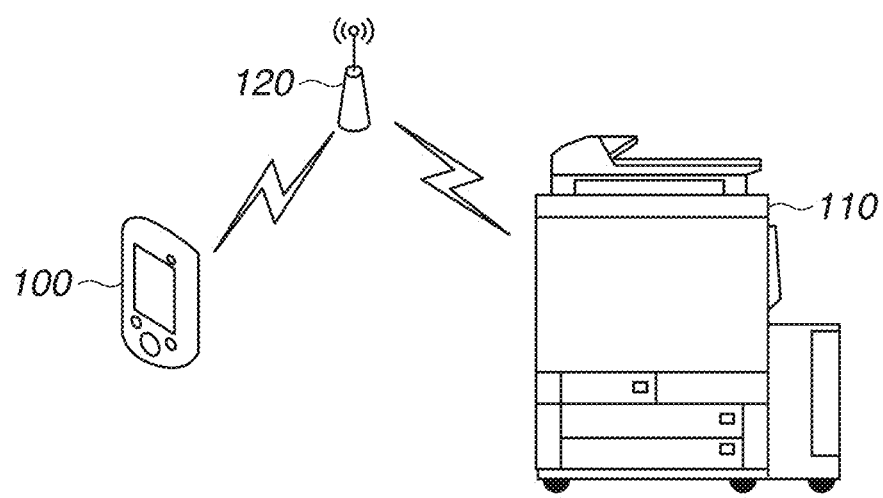
FIGS. 1A and 1B are diagrams illustrating configurations of a communication system.

A first exemplary embodiment will be described. First, a general configuration of a communication system according to the present exemplary embodiment will be described with reference to FIG. 1A. The communication system in the present exemplary embodiment includes a mobile terminal 100, a printing apparatus 110, and an access point 120. The mobile terminal 100 and the printing apparatus 110 wirelessly connect to the access point 120 respectively by using a wireless local area network (LAN) function. The mobile terminal 100 and the printing apparatus 110 wirelessly communicate with each other via the access point 120. In FIG. 1A, although a connection between the printing apparatus 110 and the access point 120 is a wireless connection provided by the wireless LAN function, the printing apparatus 110 may connect to the access point 120 through a wired network.

Figure 1B:
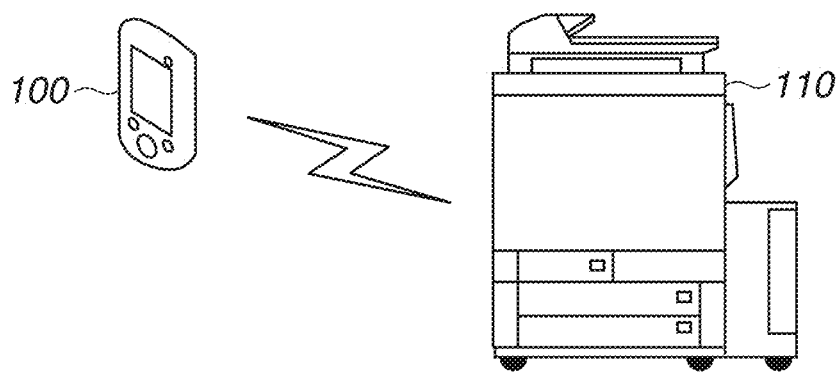

Further, the printing apparatus 110 has a direct wireless communication function such as a software access point mode. When the printing apparatus 110 executes the direct wireless communication function, the printing apparatus 110 generates a service set identifier (SSID) which functions as an access point having the generated SSID. The mobile terminal 100 wirelessly connects to the printing apparatus 110 that executes the direct wireless communication function, so that the mobile terminal 100 and the printing apparatus 110 can wirelessly communicate with each other. FIG. 1B is a diagram illustrating a state where the mobile terminal 100 wirelessly connects to the printing apparatus 110 that executes the direct wireless communication function.

In the present exemplary embodiment, a connection mode in which the mobile terminal 100 and the printing apparatus 110 communicate via a relay device such as the access point 120 as illustrated in FIG. 1A is referred to as an infrastructure connection. On the other hand, a connection mode in which the mobile terminal 100 and the printing apparatus 110 communicate with each other without interposing a relay device such as the access point 120, as illustrated in FIG. 1B, is referred to as a direct connection.

The printing apparatus 110 in the present exemplary embodiment displays a quick response (QR) code (registered trademark) for the infrastructure connection and a QR code for the direct connection. The mobile terminal 100 reads the QR code for the infrastructure connection or the direct connection displayed by the printing apparatus 110 and tries to connect to the printing apparatus 110. According to an aspect of the present exemplary embodiment, a user of the mobile terminal 100 is recommended to use the direct wireless communication function of the printing apparatus 110 when the mobile terminal 100 that reads the QR code for the infrastructure connection has failed to connect to the printing apparatus 110. This characteristic processing will be described below in detail.

A hardware configuration of the mobile terminal 100 will be described with reference to FIG. 2. Although a smartphone will be described as an example of the mobile terminal 100 in the present exemplary embodiment, the mobile terminal 100 may be another communication apparatus having a wireless LAN function or a function for reading a QR code described below.

A central processing unit (CPU) 201 reads a control program stored in the flash memory 203 and executes various types of processing for controlling the operation of the mobile terminal 100. A random access memory (RAM) 202 is used as a temporary storage area such as a main memory or a work area of the CPU 201. The flash memory 203 is a non-volatile storage medium that stores a control program of the mobile terminal 100 or data of various types such as a photograph and an electronic document.

Further, in the mobile terminal 100 of the present exemplary embodiment, although one CPU 201 executes each processing step illustrated in the below-described flowchart, the configuration is not limited thereto. For example, a plurality of CPUs may cooperatively executes each processing step illustrated in the below-described flowchart. Further, a part of the processing steps illustrated in the below-described flowchart may be executed by using a hardware circuit such as an application specific integrated circuit (ASIC).

An operation panel 204 has a touch panel function for detecting a touch operation performed by the user and displays various screens. The user can input a desirable operation instruction into the mobile terminal 100 by performing touch operation on the operation panel 204. In addition, the mobile terminal 100 includes hardware keys (not illustrated), so that the user can also input the operation instruction into the mobile terminal 100 by using the hardware keys.

A speaker 205 and a microphone 206 are used when the user makes a call to another mobile terminal or a land-line phone. A camera 207 captures an image according to an image-capturing instruction from the user. The image captured by the camera 207 is stored in a predetermined area in the flash memory 203. Further, the camera 207 has a function of reading a QR code described below.

A Bluetooth interface (I/F) 208 executes wireless communication compliant with the Bluetooth (registered trademark) standard. A wireless LAN I/F 209 has a wireless LAN function and executes wireless communication compliant with a communication standard such as the Institute of Electrical and Electronics Engineers (IEEE) 802.11a, 802.11b, 802.11g, 802.11n, or 802.11ac.

Figure 3:
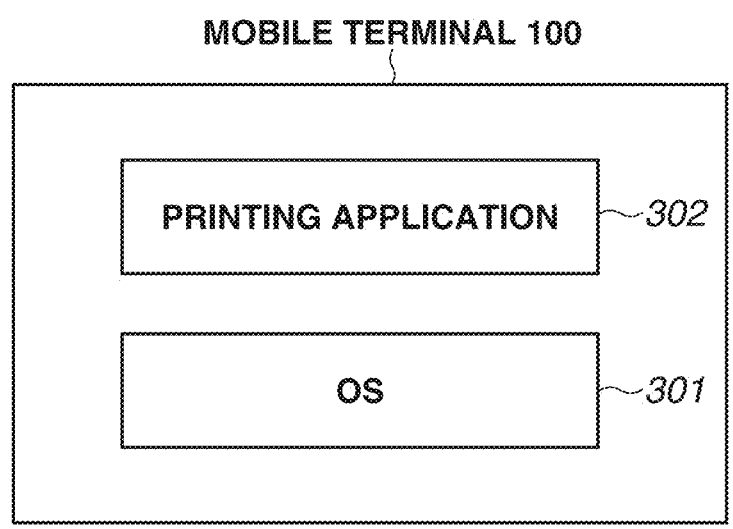
FIG. 3 is a block diagram illustrating a software configuration of the mobile terminal.

Next, a software configuration of the mobile terminal 100 will be described with reference to FIG. 3. FIG. 3 is a functional block diagram realized by the CPU 201 by executing a control program stored in the flash memory 203.

An operating system (OS) 301 is software for controlling the operation of the mobile terminal 100. Various applications can be installed in the mobile terminal 100 in addition to a printing application 302 described below. The OS 301 controls the operation of the mobile terminal 100 according to an instruction received from each application or an operation instruction input by the user through the operation panel 204.

The printing application 302 is an application that provides a printing function to the user. The printing application 302 instructs the OS 301 to analyze the QR code read by the mobile terminal 100, search for the printing apparatus 110, generate print data, and transmit the generated print data.

Although various applications other than the printing application 302 are installed in the mobile terminal 100, description relating to the other applications will be omitted.

Figure 4:
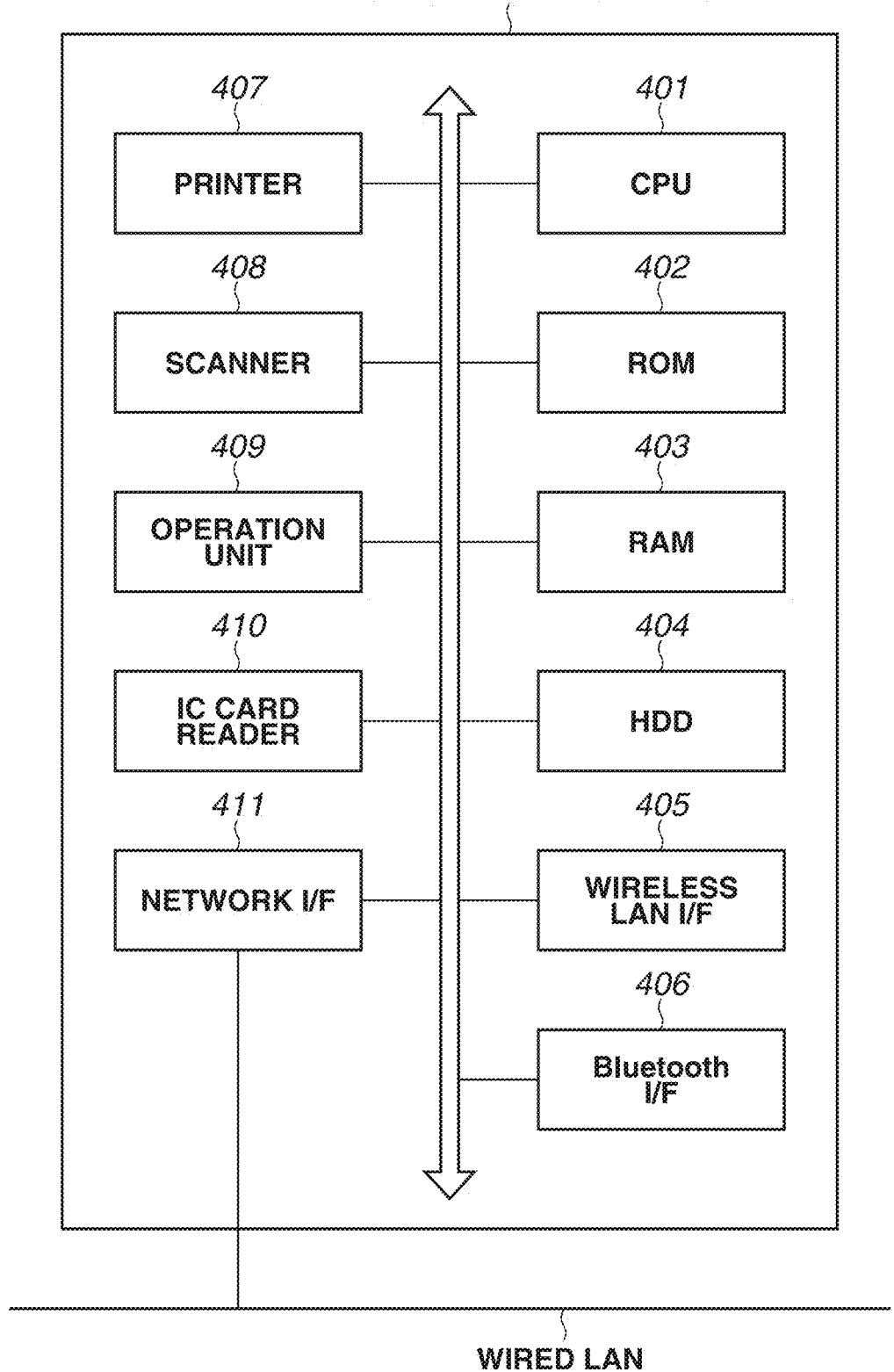
FIG. 4 is a block diagram illustrating a hardware configuration of a printing apparatus.

Next, a hardware configuration of the printing apparatus 110 will be described with reference to FIG. 4. The printing apparatus 110 is an example of the device.

A CPU 401 reads a control program stored in a read only memory (ROM) 402 and executes various types of processing for controlling the operation of the printing apparatus 110. The ROM 402 stores a control program. A RAM 403 is used as a temporary storage area such as a main memory or a work area of the CPU 401. A hard disk drive (HDD) 404 is a non-volatile storage medium for storing various types of data.

A wireless LAN I/F 405 has a wireless LAN function and executes wireless communication compliant with a communication standard such as the IEEE 802.11a, 802.11b, 802.11g, 802.11n, or 802.11ac. Further, the wireless LAN I/F 405 can operate in a software access point mode. When the wireless LAN I/F 405 operates in the software access point mode, the printing apparatus 110 generates an SSID and a connection key and operates as an access point. When the mobile terminal 100 connects to the access point indicated by the SSID generated by the printing apparatus 110, wireless connection is established between the mobile terminal 100 and the printing apparatus 110. The software access point mode is an example of the direct wireless communication function in which the mobile terminal 100 and the printing apparatus 110 wirelessly connect to each other without interposing a relay apparatus such as the access point 120. The direct wireless communication function may be the Wi-Fi Direct instead of the software access point mode.

A Bluetooth I/F 406 executes wireless communication compliant with the Bluetooth standard. A network I/F 411 can communicate with an external apparatus such as a personal computer (PC) connected to the wired LAN.

A printer 407 executes printing processing on a sheet based on print data received through the wireless LAN I/F 405 or the network I/F 411. A scanner 408 reads a document placed by the user and generates a document image. The document image generated by the scanner 408 is printed by the printer 407 (i.e., copy processing) or stored in the HDD 404.

An operation unit 409 includes a liquid crystal display unit having a touch panel function or a keyboard, and displays various operation screens. The user can input an instruction or information into the printing apparatus 110 via the operation unit 409. An integrated circuit (IC) card reader 410 reads user information from an IC card. The printing apparatus 110 executes authentication processing using the user information read by the IC card reader 410.

In order to improve the convenience of the user in connecting the mobile terminal 100 to the printing apparatus 110, the printing apparatus 110 displays a QR code as the connection information necessary for the mobile terminal 100 to connect to the printing apparatus 110. The mobile terminal 100 uses the camera 207 to read the QR code displayed in the printing apparatus 110 and connects to the printing apparatus 110 by using the connection information included in the QR code.

Figure 5A:
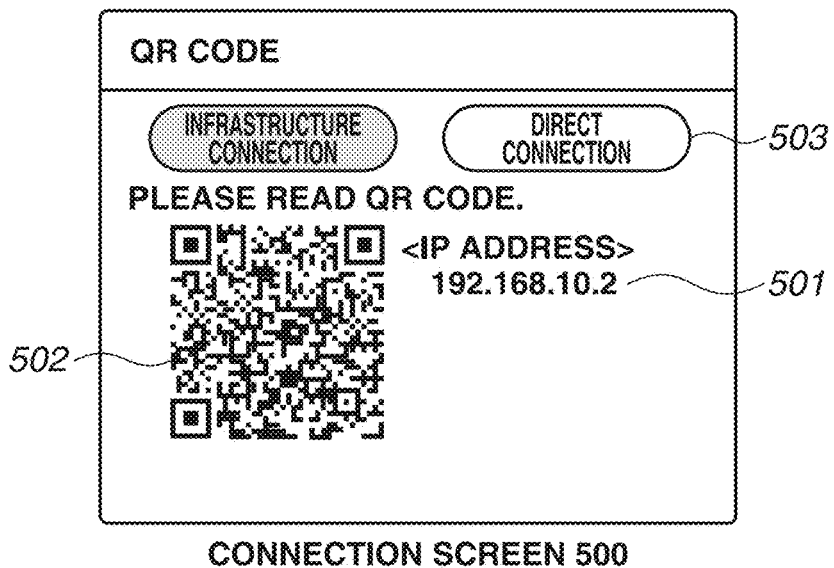
FIGS. 5A, 5B, and 5C are diagrams illustrating screens displayed by the printing apparatus.
Figure 5B:
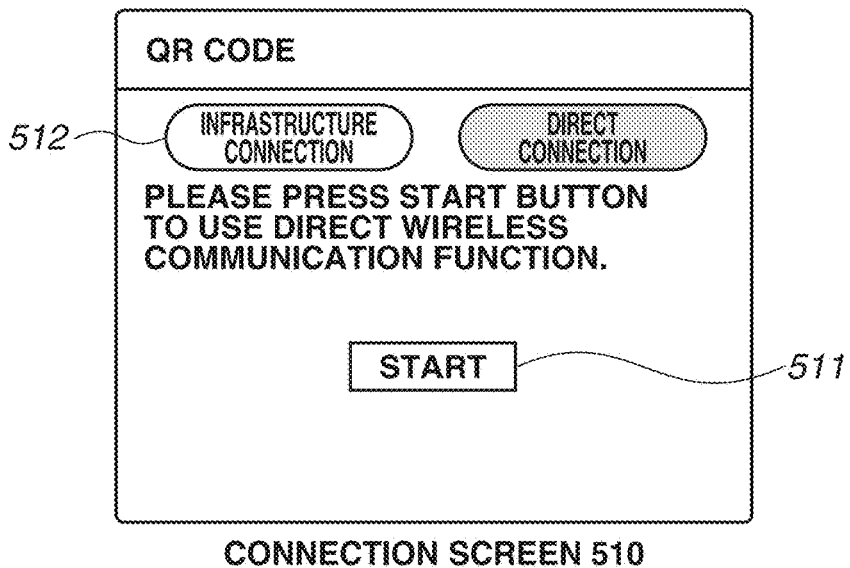
Figure 5C:
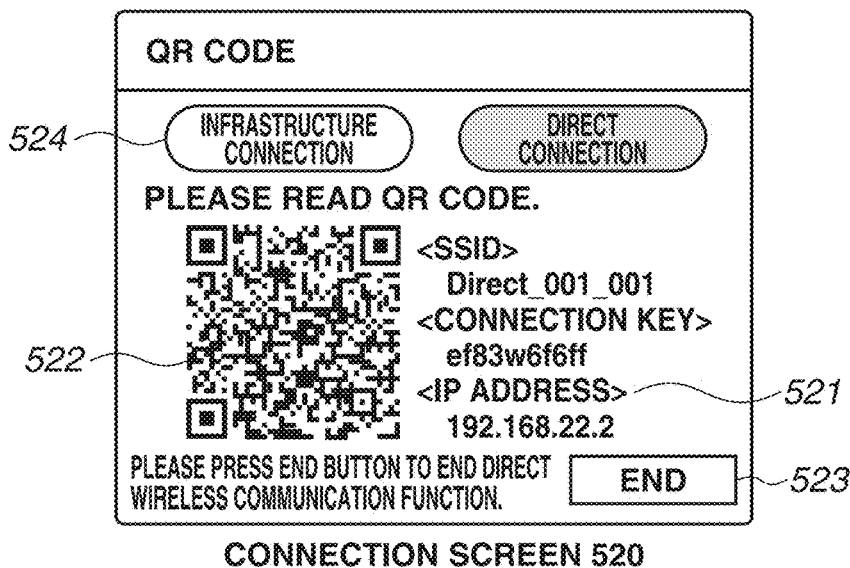

FIGS. 5A to 5C are diagrams illustrating specific examples of the QR codes displayed by the printing apparatus 110. The printing apparatus 110 can display two kinds of QR codes, i.e., a QR code for the infrastructure connection and a QR code for the direct connection. The QR code is an example of a two-dimensional code, and a code of a different type may be used.

A connection screen 500 in FIG. 5A is a screen for displaying the QR code for the infrastructure connection, which is displayed on the operation unit 409 of the printing apparatus 110. An item 501 illustrates an IP address of the printing apparatus 110. A QR code 502 is the QR code for the infrastructure connection. The IP address of the printing apparatus 110 is included in the QR code 502, so that the mobile terminal 100 can acquire the IP address of the printing apparatus 110 by reading the QR code 502 through the camera 207. Further, the user can switch the QR code to be displayed to the QR code for the direct connection by using a button 503. The IP address is an example of the address information, and a MAC address may be used instead of the IP address.

When the user presses the button 503, the operation unit 409 of the printing apparatus 110 displays a connection screen 510 in FIG. 5B. A start button 511 that allows the user to start the operation of the printing apparatus 110 in the software access point mode is displayed on the connection screen 510. The user needs first to press the start button 511 in order to directly and wirelessly connect the mobile terminal 100 to the printing apparatus 110. Further, the user can switch the QR code to be displayed to the QR code for the infrastructure connection by using a button 512. When the user presses the button 512, the operation unit 409 of the printing apparatus 110 displays the connection screen 500 in FIG. 5A.

When the user presses the start button 511, the printing apparatus 110 starts the operation of the software access point mode, and the operation unit 409 displays a connection screen 520 in FIG. 5C. The SSID generated by the printing apparatus 110, the connection key, and the IP address used by the printing apparatus 110 operating in the software access point mode are displayed on an item 521. A QR code 522 is the QR code for the direct connection. The SSID generated by the printing apparatus 110, the connection key, and the IP address used by the printing apparatus 110 operating in the software access point mode are included in the QR code 522. The mobile terminal 100 can acquire the SSID generated by the printing apparatus 110, the connection key, and the IP address used by the printing apparatus 110 operating in the software access point mode by reading the QR code 522 using the camera 207.

An end button 523 allows the user to end the operation of the printing apparatus 110 in the software access point mode. When the user presses the end button 523, the printing apparatus 110 ends the operation of the software access point mode, and the operation unit 409 displays the connection screen 500 in FIG. 5A. Further, the user can switch the QR code to be displayed to the QR code for the infrastructure connection by using a button 524. When the user presses the button 524, the operation unit 409 of the printing apparatus 110 displays the connection screen 500 in FIG. 5A.

Next, processing in which the mobile terminal 100 tries to connect to the printing apparatus 110 by reading the QR code displayed in the printing apparatus 110 will be described with reference to FIG. 6. The CPU 201 loads a control program stored in a memory such as the flash memory 203 to the RAM 202 and executes the control program, so that the respective steps illustrated in the flowchart in FIG. 6 are processed thereby. In addition, a configuration of the mobile terminal 100 may be such that the CPU 201 executes at least a part of the steps of the flowchart in FIG. 6 while the rest of the steps are executed by another CPU (not illustrated) different from the CPU 201.

First, in step S601, the camera 207 of the mobile terminal 100 reads the QR code displayed in the printing apparatus 110. A reading function of the camera 207 is executed by the CPU 201.

Figure 7A:
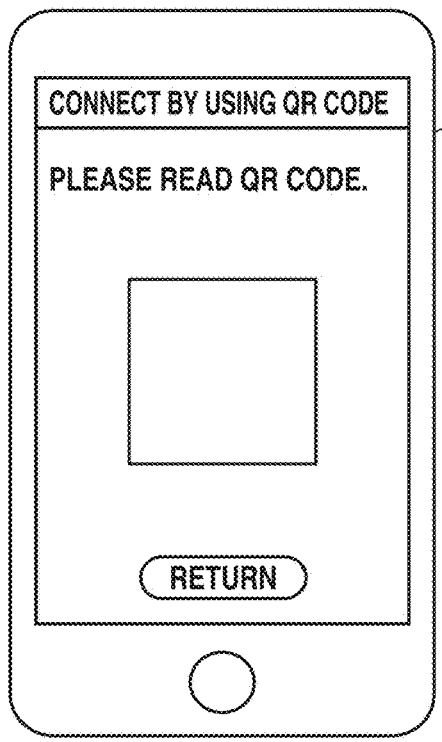
FIGS. 7A, 7B, 7C, and 7D are diagrams illustrating screens displayed by the mobile terminal.

An application screen 700 in FIG. 7A is displayed on the operation panel 204 of the mobile terminal 100 when the QR code is read by the camera 207. The application screen 700 is a screen provided by the printing application 302, which is displayed on the operation panel 204 of the mobile terminal 100 when the printing application 302 gives a display instruction to the OS 301.

Next, in step S602, the printing application 302 analyzes the QR code read by the camera 207 and determines whether the read QR code is the QR code for the direct connection or the infrastructure connection. If the read QR code is the QR code for the direct connection (YES in step S602), the processing proceeds to step S607. On the other hand, if the read QR code is the QR code for the infrastructure connection (NO in step S602), the processing proceeds to step S603. In the present exemplary embodiment, if the SSID is included in the read QR code, the printing application 302 determines that the read QR code is the QR code for the direct connection. On the other hand, if the SSID is not included in the read QR code, the printing application 302 determines that the read QR code is the QR code for the infrastructure connection. The processing described in step S602 will be realized by the CPU 201.

Next, step S607 will be described. In step S607, the printing application 302 instructs the OS 301 to connect to the access point indicated by the SSID included in the analyzed QR code. Then, the OS 301 controls the wireless LAN I/F 209 of the mobile terminal 100 to connect to the access point indicated by the SSID according to the instruction of the printing application 302. A connection key included in the analyzed QR code is used for connecting to the access point. Through the processing in step S607, the mobile terminal 100 directly and wirelessly connect to the printing apparatus 110 operating in the software access point mode. The processing described in step S607 will be realized by the CPU 201.

Next, step S603 will be described. In step S603, the printing application 302 executes search processing for searching for the printing apparatus 110. The IP address of the printing apparatus 110 is included in the QR code for the infrastructure connection. The printing application 302 instructs the OS 301 to search for the printing apparatus 110 having this IP address. Then, the OS 301 controls the wireless LAN I/F 209 to transmit a device search packet to the network which the mobile terminal 100 connects to. For example, if the mobile terminal 100 connects to the access point 120, the wireless LAN I/F 209 transmits the device search packet to the wireless network of the access point 120. The processing described in step S603 will be realized by the CPU 201.

Figure 7B:
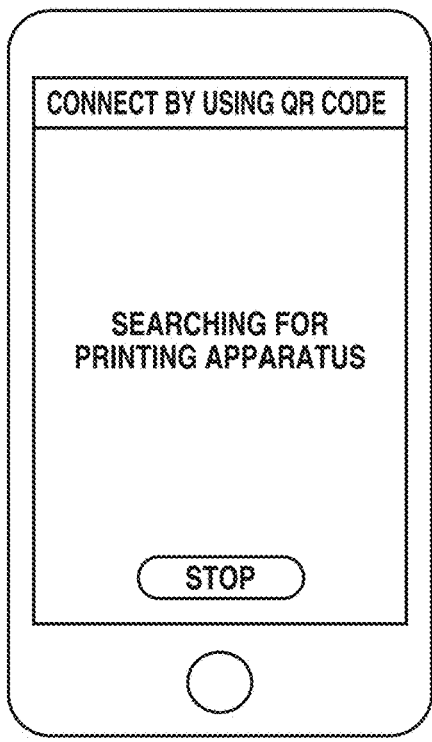

Further, while the printing application 302 is searching for the printing apparatus 110, the operation panel 204 displays the application screen 710 in FIG. 7B. The application screen 710 is a screen provided by the printing application 302, which is displayed on the operation panel 204 of the mobile terminal 100 when the printing application 302 gives a display instruction to the OS 301.

Next, step S604 will be described. In step S604, the printing application 302 determines whether the printing apparatus of the IP address included in the read QR code (i.e., the printing apparatus 110) is detected. In step S604, if a response to the device search packet is received from the printing apparatus 110 (YES in step S604), the printing application 302 determines that the printing apparatus 110 is detected. Then, the processing proceeds to step S606. In a case where the mobile terminal 100 connects to the network which the printing apparatus 110 participates in, the printing application 302 can detect the printing apparatus 110. On the other hand, in step S604, if a predetermined time (e.g., 30 seconds) has passed without receiving a response to the device search packet from the printing apparatus 110 (NO in step S604), the printing application 302 determines that the printing apparatus 110 could not be detected. Then, the processing proceeds to step S605. In a case where the mobile terminal 100 does not connect to the network which the printing apparatus 110 participates in, the printing application 302 cannot detect the printing apparatus 110. The processing described in step S604 will be realized by the CPU 201.

Next, step S606 will be described. In step S606, the printing application 302 which detects the printing apparatus of the IP address included in the read QR code (i.e., printing apparatus 110) instructs the OS 301 to connect to the printing apparatus 110. Then, the OS 301 controls the wireless LAN I/F 209 to connect to the printing apparatus 110 according to the instruction of the printing application 302. Through the processing in step S606, the mobile terminal 100 connects to the printing apparatus 110. In the present exemplary embodiment, connection of the mobile terminal 100 to the printing apparatus 110 implies establishment of a hypertext transfer protocol (HTTP) connection between the mobile terminal 100 and the printing apparatus 110. The processing described in step S606 will be realized by the CPU 201.

Figure 7C:
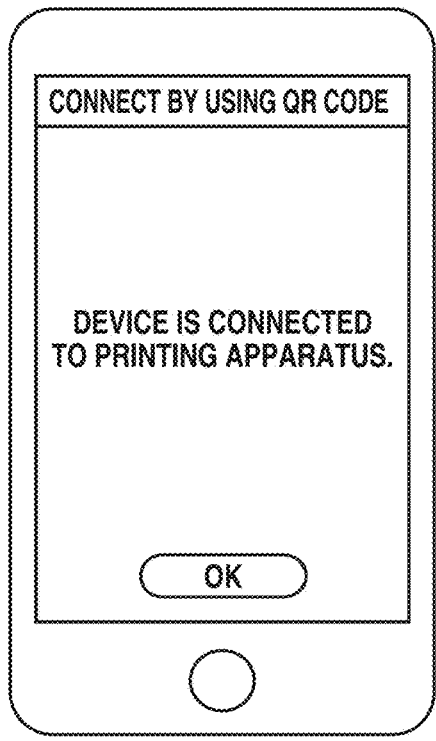

When the mobile terminal 100 connects to the printing apparatus 110 detected through the search processing, the operation panel 204 displays the application screen 720 in FIG. 7C. The application screen 720 is a screen for notifying the user that the mobile terminal 100 has been successfully connected to the printing apparatus 110. The application screen 720 is a screen provided by the printing application 302, which is displayed on the operation panel 204 of the mobile terminal 100 when the printing application 302 issues a display instruction to the OS 301.

Next, step S605 will be described. The processing in step S605 is executed when the printing apparatus of the IP address included in the read QR code (i.e., the printing apparatus 110) could not be detected. In step S605, the printing application 302 recommends the user to use the direct wireless communication function. Specifically, the printing application 302 instructs the OS 301 to display an application screen 730 in FIG. 7D, so that the OS 301 displays the application screen 730 in FIG. 7D on the operation panel 204. The application screen 730 is a screen for notifying the user to reconnect the mobile terminal 100 by using the direct wireless communication function. A message 731 recommending the user to use the direct wireless communication function of the printing apparatus 110 is displayed on the application screen 730. The processing described in step S605 will be realized by the CPU 201.

A printing apparatus of the IP address included in the read QR code (i.e., the printing apparatus 110) cannot be detected because the mobile terminal 100 does not connect to the network which the printing apparatus 110 participates in. On the other hand, even if the mobile terminal 100 does not connect to the network which the printing apparatus 110 participates in, the mobile terminal 100 can directly connect to the printing apparatus 110 by using the direct wireless communication function of the printing apparatus 110.

Therefore, in the present exemplary embodiment, in step S605, in a case where the printing apparatus of the IP address included in the read QR code cannot be detected, the user is recommended to use the direct wireless communication function. Thus, the user can easily find out that the mobile terminal 100 can be connected to the printing apparatus 110 by using the direct wireless communication function of the printing apparatus 110 in a case where the printing apparatus 110 cannot be detected through the search processing. For example, after checking the message 731, the user displays the connection screen 510 and presses the start button 511. When this operation is performed, the printing apparatus 110 starts the operation of the software access point mode and displays the QR code 522. The user can directly connect the mobile terminal 100 to the printing apparatus 110 by reading the QR code 522 again.

Next, a second exemplary embodiment will be described. In the present exemplary embodiment, description will be given of a configuration in which the processing that is executed by the mobile terminal 100 when the printing apparatus of the IP address included in the read QR code cannot be detected, is switched based on the ON/OFF setting of the direct wireless communication function of the printing apparatus 110. The configurations of the mobile terminal 100 and the printing apparatus 110 are similar to those described in the first exemplary embodiment, and thus description thereof will be omitted.

Figure 8:
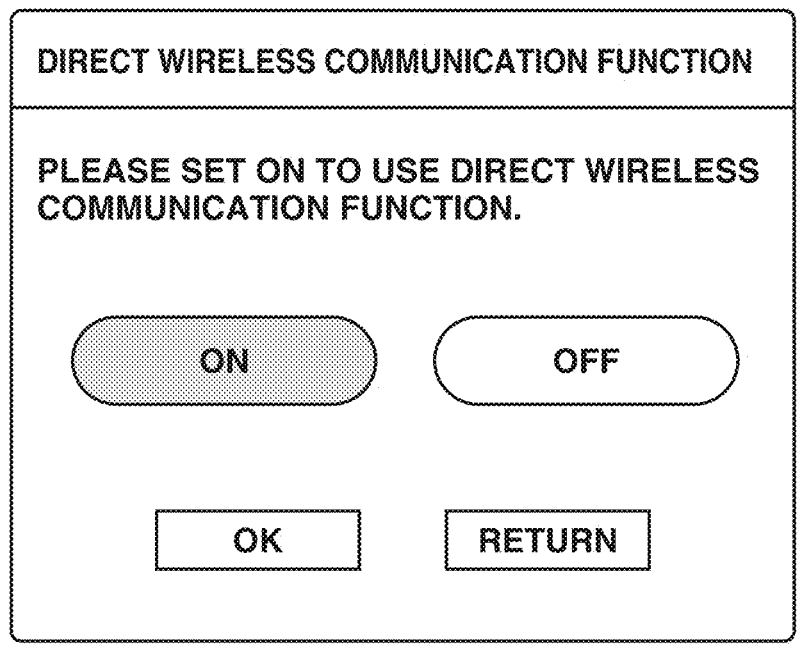
FIG. 8 is a diagram illustrating a screen displayed by the printing apparatus.

A setting screen 800 in FIG. 8 is a screen for allowing a user (e.g., system administrator) to set whether to permit the use of the direct wireless communication function as a setting of the printing apparatus 110, which is displayed on the operation unit 409 of the printing apparatus 110. The user sets "ON" when the user permits the use of the direct wireless communication function in the printing apparatus 110. On the other hand, the user sets "OFF" when the user does not permit the use of the direct wireless communication function in the printing apparatus 110.

Next, QR codes for the infrastructure connection and the direct connection displayed by the printing apparatus 110 will be described. The present exemplary embodiment is different from the first exemplary embodiment in that the information included in the QR code for the infrastructure connection is changed depending on whether setting of the direct wireless communication function is ON or OFF.

Figure 9A:
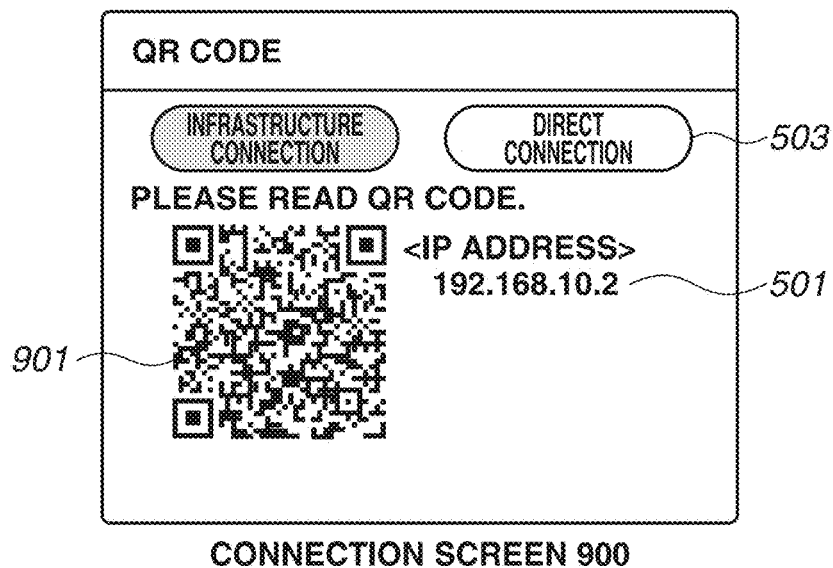
FIGS. 9A, 9B, and 9C are diagrams illustrating screens displayed by the printing apparatus.
Figure 9B:
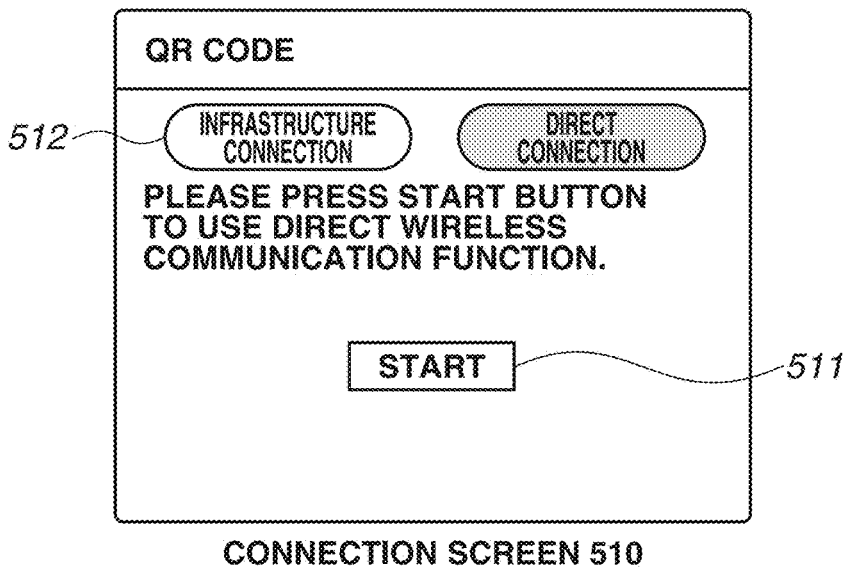
Figure 9C:
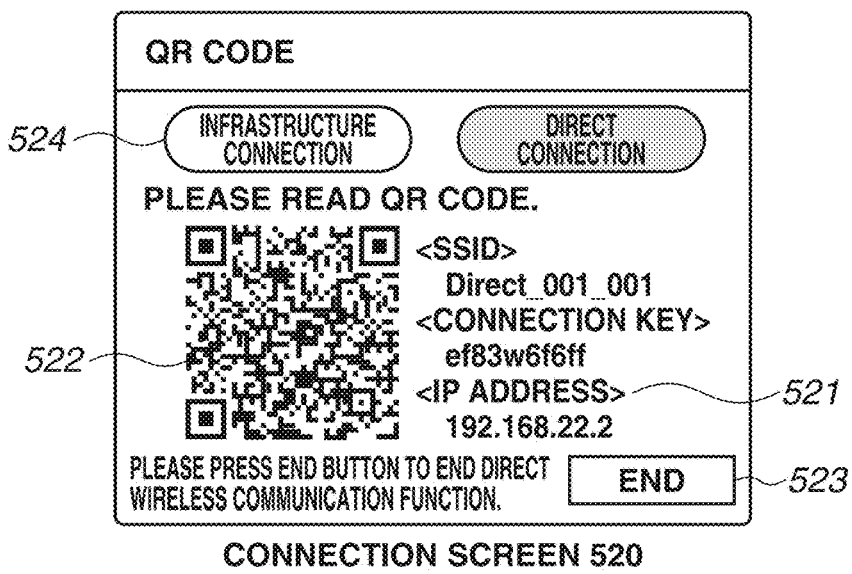

FIGS. 9A to 9C are diagrams illustrating the QR codes for the infrastructure connection and the direct connection displayed when setting of the direct wireless communication function is ON. Since respective screens in FIG. 9A to 9C are approximately the same as those illustrated in FIGS. 5A to 5C, only configurations different from those in FIGS. 5A to 5C will be described. A connection screen 900 in FIG. 9A is a screen for displaying the QR code for the infrastructure connection, which is displayed on the operation unit 409 of the printing apparatus 110. A QR code 901 is displayed on the connection screen 900. Similar to the first exemplary embodiment, the IP address of the printing apparatus 110 is included in the QR code 901. Further, different from the first exemplary embodiment, setting information indicating that setting of the direct wireless communication function is ON is included in the QR code 901. In other words, by reading the QR code 901, the mobile terminal 100 can find out that setting of the direct wireless communication function is ON (i.e., the direct wireless communication function is usable) in the printing apparatus 110 in addition to acquiring the IP address of the printing apparatus 110.

Figure 10A:
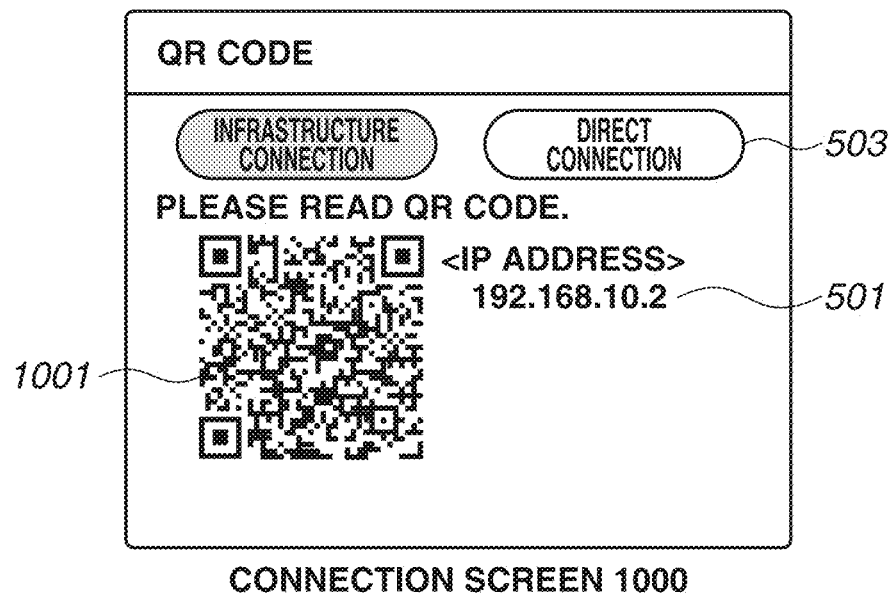
FIGS. 10A and 10B are diagrams illustrating screens displayed by the printing apparatus.
Figure 10B:
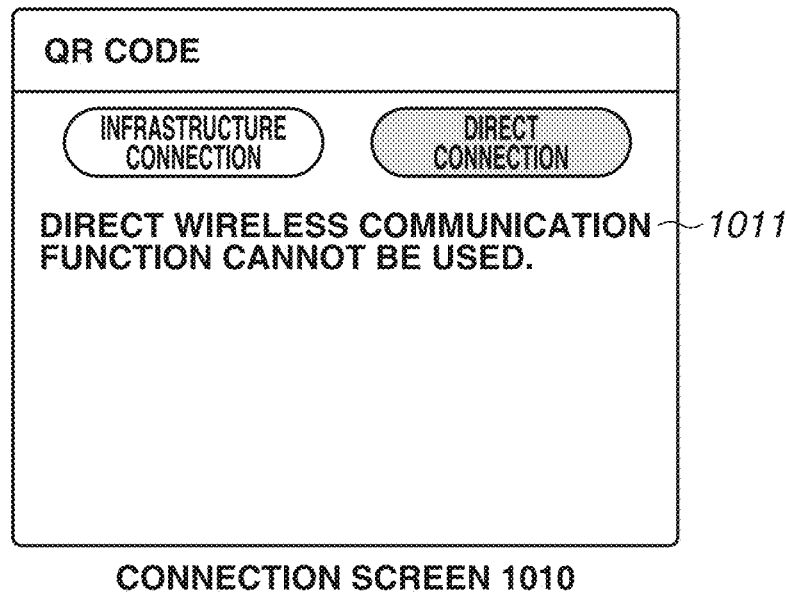

Next, FIGS. 10A and 10B will be described. FIGS. 10A and 10B are diagrams illustrating the QR code for the infrastructure connection and the QR code for the direct connection. The QR codes are displayed when setting of the direct wireless communication function is OFF. A connection screen 1000 in FIG. 10A is a screen for displaying the QR code for the infrastructure connection, which is displayed on the operation unit 409 of the printing apparatus 110. A QR code 1001 is displayed on the connection screen 1000. Similar to the first exemplary embodiment, the IP address of the printing apparatus 110 is included in the QR code 1001. Further, differently from the first exemplary embodiment, setting information indicating that setting of the direct wireless communication function is OFF is included in the QR code 1001. In other words, by reading the QR code 1001, the mobile terminal 100 can find out that setting of the direct wireless communication function is OFF (i.e., the direct wireless communication function is not usable) in the printing apparatus 110 in addition to the IP address of the printing apparatus 110 which the mobile terminal 100 can find.

When the user presses a button 503 in the connection screen 1000, the operation unit 409 of the printing apparatus 110 displays a connection screen 1010 in FIG. 10B. Since the setting of the direct wireless communication function is OFF, a message 1011 notifying the user that the direct wireless communication function cannot be used is displayed on the connection screen 1010. Differently from the connection screen 510 in FIG. 5B or 9B, the start button 511 is not displayed on the connection screen 1010.

Figure 11:
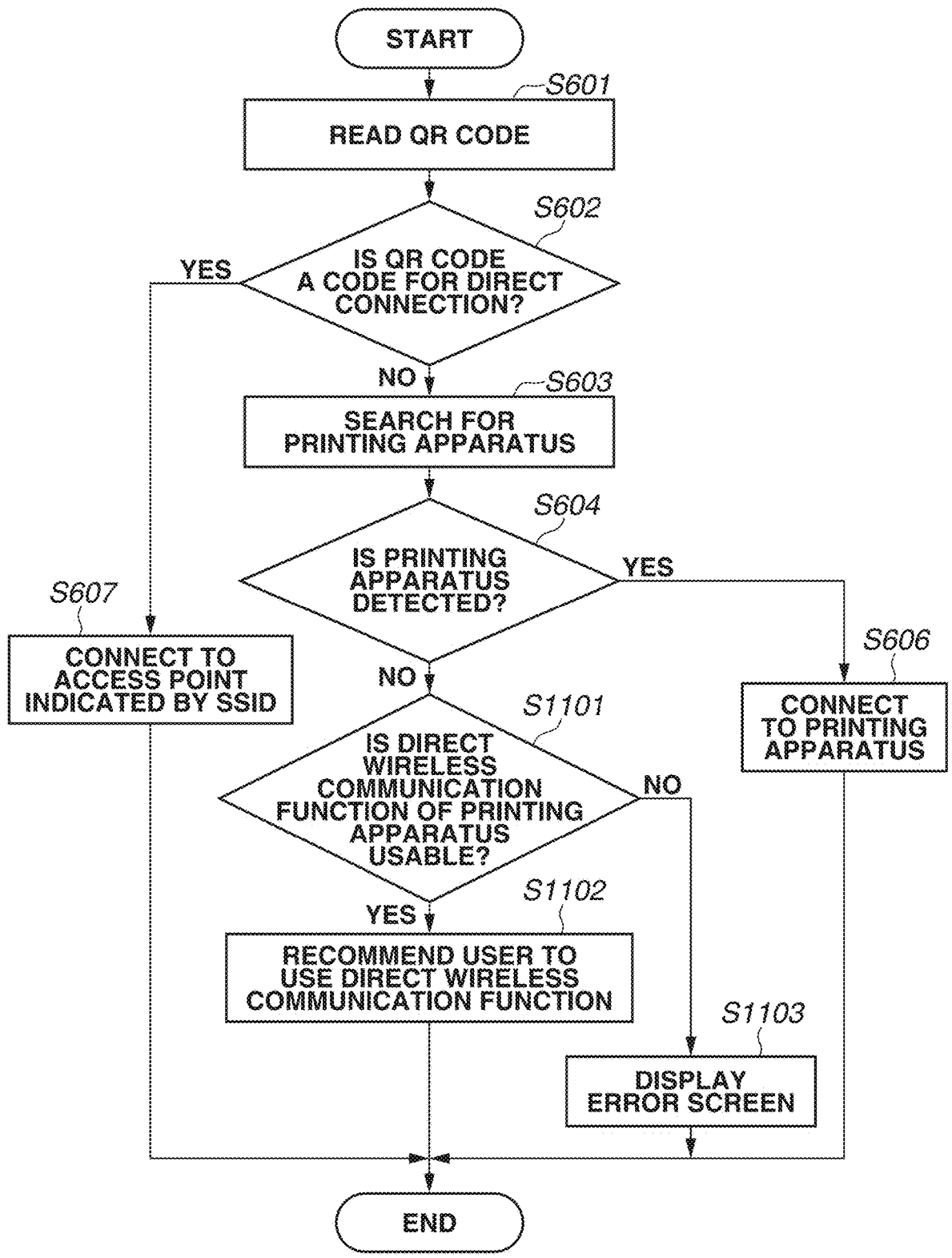
FIG. 11 is a flowchart illustrating processing executed by the mobile terminal.

Next, processing in which the mobile terminal 100 reads the QR code displayed in the printing apparatus 110 and tries to connect to the printing apparatus 110 will be described with reference to FIG. 11. The CPU 201 loads a control program stored in a memory such as the flash memory 203 to the RAM 202 and executes the control program, so that each step illustrated in the flowchart in FIG. 11 is processed. However, a configuration of the mobile terminal 100 may be such that the CPU 201 executes at least a part of the steps of the flowchart in FIG. 11 while the rest of the steps are executed by another CPU (not illustrated) different from the CPU 201. Further, of the steps in the flowchart in FIG. 11, steps having same reference numerals as those in FIG. 6 performs the processing similar to the processing described in FIG. 6, therefore, these steps will not be described.

When the camera 207 of the mobile terminal 100 reads the QR code for the infrastructure connection, in step S603, the printing application 302 executes search processing to search for the printing apparatus 110. Then, in step S604, the printing application 302 determines whether the printing apparatus of the IP address included in the read QR code (i.e., the printing apparatus 110) is detected. If the printing apparatus 110 cannot be detected (NO in step S604), the processing proceeds to step S1101.

Step S1101 will be described. In step S1101, the printing application 302 determines whether the direct wireless communication function of the printing apparatus 110 can be used. As described in FIGS. 9A to 9C and FIGS. 10A to 10B, either the setting information indicating that setting of the direct wireless communication function is ON or the setting information indicating that setting of the direct wireless communication function is OFF is included in the QR code for the infrastructure connection. By checking the setting information included in the QR code, the printing application 302 determines whether the direct wireless communication function of the printing apparatus 110 can be used. If the setting information included in the QR code indicates that setting of the direct wireless communication function is ON (YES in step S1101), the printing application 302 determines that the direct wireless communication function of the printing apparatus 110 is usable, and the processing proceeds to step S1102. On the other hand, if the setting information included in the QR code indicates that setting of the direct wireless communication function is OFF (NO in step S1101), the printing application 302 determines that the direct wireless communication function of the printing apparatus 110 is not usable, and the processing proceeds to step S1103. The processing described in step S1101 is realized by the CPU 201.

Next, step S1102 will be described. In step S1102, the printing application 302 recommends the user to use the direct wireless communication function. Specifically, the printing application 302 instructs the OS 301 to display the application screen 730 in FIG. 7D, so that the OS 301 displays the application screen 730 in FIG. 7D on the operation panel 204. A message 731 for recommending the user to use the direct wireless communication function of the printing apparatus 110 is displayed on the application screen 730. The processing described in step S1102 is realized by the CPU 201.

Figure 7D:
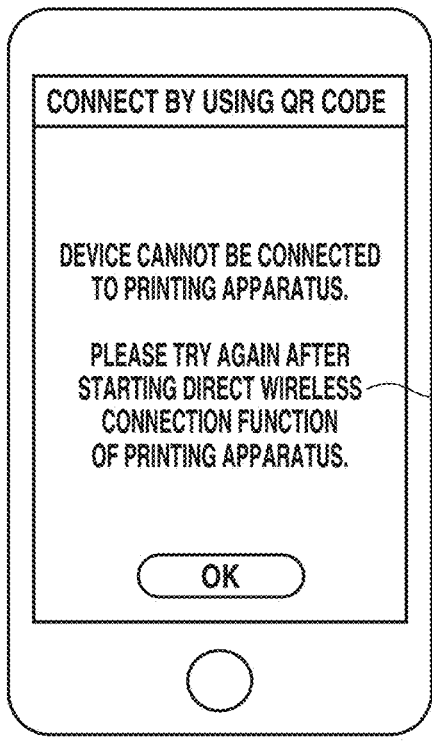
Figure 12:
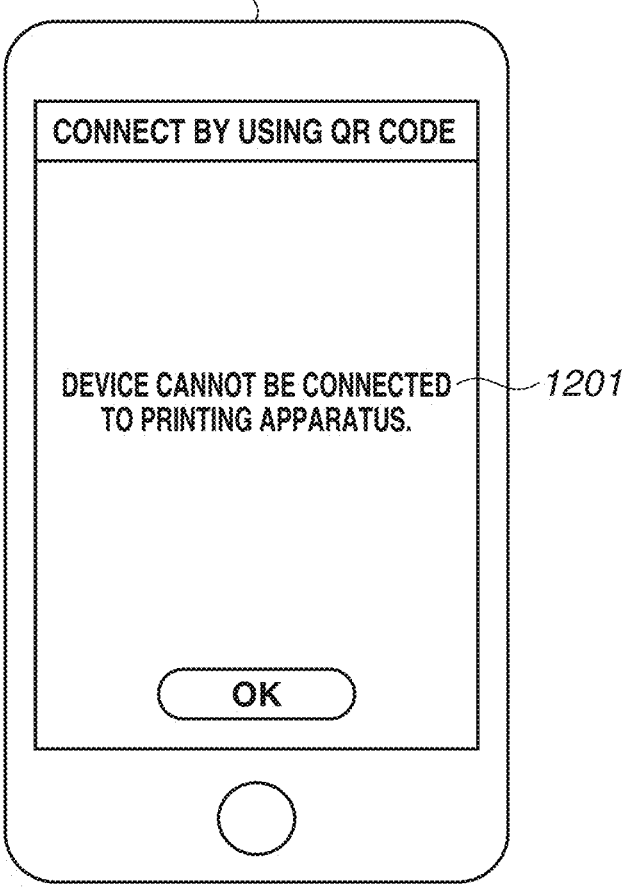
FIG. 12 is a diagram illustrating a screen displayed by the mobile terminal.

Next, step S1103 will be described. In step S1103, the printing application 302 displays an error screen. The printing application 302 instructs the OS 301 to display an application screen 1200 in FIG. 12, so that the OS 301 displays the application screen 1200 in FIG. 12 on the operation panel 204. A message 1201 indicating that connection of the mobile terminal 100 to the printing apparatus 110 has failed is displayed on the application screen 1200. On the other hand, a message recommending the user to use the direct wireless communication function of the printing apparatus 110, such as the message 731 in FIG. 7D, is not displayed on the application screen 1200.

As described above, if the setting information indicating that setting of the direct wireless communication function is ON is included in the read QR code, in step S1102, the mobile terminal 100 recommends the user to use the direct wireless communication function of the printing apparatus 110. On the other hand, if the setting information indicating that setting of the direct wireless communication function is ON is not included in the read QR code, in step S1103, the mobile terminal 100 does not recommend the user to use the direct wireless communication function of the printing apparatus 110. The user cannot use the direct wireless communication function of the printing apparatus 110 even if the user is recommended to use the direct wireless communication function of the printing apparatus 110 when setting of the direct wireless communication function is OFF in the printing apparatus 110. According to the present exemplary embodiment, when setting of the direct wireless communication function is ON in the printing apparatus 110, i.e., when the direct wireless communication function of the printing apparatus 110 is usable, the mobile terminal 100 can recommend the user to use the direct wireless communication function of the printing apparatus 110.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
a memory; and
a processor in communication with the memory, the processor being configured to perform operations comprising:
reading a two-dimensional code displayed by a printer;
determining whether information for using a direct wireless communication function of the printer is included in the two-dimensional code;
connecting to the printer via the direct wireless communication function based on the included information in a case where it is determined that the information for using the direct wireless communication function of the printer is included in the two-dimensional code;
performing a search operation to search for the printer in a case where it is determined that the information for using the direct wireless communication function of the printer is not included in the two-dimensional code; and
notifying a user of the communication apparatus of a message to prompt the user to use the direct wireless communication function of the printer upon condition that it is determined that the information for using the direct wireless communication function of the printer is not included in the two-dimensional code and the search operation to search for the printer has failed.

2. The communication apparatus according to claim 1, wherein the message is not displayed in a case where it is determined that the information for using the direct wireless communication function of the printer is included in the two-dimensional code.

3. The communication apparatus according to claim 1, wherein, if the printer is detected through the search operation, the communication apparatus connects to the detected printer.

4. The communication apparatus according to claim 1, wherein the information for using the direct wireless communication function of the printer includes at least a Service Set Identifier (SSID) for using the direct wireless communication function.

5. The communication apparatus according to claim 1, wherein the two-dimensional code is a quick response (QR) code.

6. A control method for controlling a communication apparatus comprising:
reading a two-dimensional code displayed by a printer;
determining whether information for using a direct wireless communication function of the printer is included in the two-dimensional code;
connecting to the printer via the direct wireless communication function based on the included information in a case where it is determined that the information for using the direct wireless communication function of the printer is included in the two-dimensional code;
performing a search operation to search for the printer in a case where it is determined that the information for using the direct wireless communication function of the printer is not included in the two-dimensional code; and
notifying a user of the communication apparatus of a message to prompt the user to use the direct wireless communication function of the printer upon condition that it is determined that the information for using the direct wireless communication function of the printer is not included in the two-dimensional code and the search operation to search for the printer has failed.

7. The control method according to claim 6, wherein the message is not displayed in a case where it is determined that the information for using the direct wireless communication function of the printer is included in the two-dimensional code.

8. The control method according to claim 6, wherein, if the printer is detected through the search operation, connecting the communication apparatus to the detected printer.

9. The control method according to claim 6, wherein the information for using the direct wireless communication function of the printer includes at least a Service Set Identifier (SSID) for using the direct wireless communication function.

10. The control method according to claim 6, wherein the two-dimensional code is a quick response (QR) code.

11. A non-transitory computer-readable medium having stored thereon a computer program comprising program code having computer-executable instructions for causing a computer to execute a control method for controlling a communication apparatus comprising:
reading a two-dimensional code displayed by a printer;
determining whether information for using a direct wireless communication function of the printer is included in the two-dimensional code;
connecting to the printer via the direct wireless communication function based on the included information in a case where it is determined that the information for using the direct wireless communication function of the printer is included in the two-dimensional code;
performing a search operation to search for the printer in a case where it is determined that the information for using the direct wireless communication function of the printer is not included in the two-dimensional code; and
notifying a user of the communication apparatus of a message to prompt the user to use the direct wireless communication function of the printer upon condition that it is determined that the information for using the direct wireless communication function of the printer is not included in the two-dimensional code and the search operation to search for the printer has failed.

12. A control method for controlling a communication apparatus comprising:
reading a two-dimensional code displayed by an external apparatus;
establishing communication with the external apparatus based on an IP address included in the two-dimensional code;
determining whether predetermined information about direct wireless communication is included in the two-dimensional code, wherein the two-dimensional code displayed by an external apparatus which is permitted to use a direct wireless communication function and the direct wireless communication function of which is stopped includes the predetermined information, and wherein the two-dimensional code displayed by an external apparatus which is not permitted to use the direct wireless communication function does not include the predetermined information; and
wherein control is performed to notify a user of a first message in a case where establishing the communication based on the IP address has failed and where it is determined that the predetermined information is included in the two-dimensional code, wherein the first message prompts the user to use the direct wireless communication function of the external apparatus, and
wherein control is performed to notify the user of a second message in a case where establishing the communication based on the IP address has failed and where it is determined that the predetermined information is not included in the two-dimensional code, wherein the second message does not include the first message but includes an error message that indicates establishing the communication has failed.

13. The control method according to claim 12, wherein the predetermined information is information indicating that direct wireless communication is executable.

14. The control method according to claim 12, wherein the two-dimensional code is a quick response (QR) code.

15. The control method according to claim 12, wherein the external apparatus is a printer having a printing device.

16. The control method according to claim 12, wherein the external apparatus is an image processing apparatus having a scanner device.

* * * * *